(12) United States Patent
Beuchert et al.

(10) Patent No.: US 9,894,913 B2
(45) Date of Patent: Feb. 20, 2018

(54) FILLING UNIT AND METHOD FOR FILLING A CONFECTIONERY PRODUCT INTO A MOULD OR A CONTAINER

(71) Applicant: Gram Equipment A/S, Vojens (DK)

(72) Inventors: Karsten Beuchert, Hedenstad (DK); Poul Erik Petersen, Vejle (DK); Peter Mathiasen, Kolding (DK)

(*) Notice: Subject to any disclaimer, the term of this patent is extended or adjusted under 35 U.S.C. 154(b) by 35 days.

(21) Appl. No.: 14/775,115

(22) PCT Filed: Mar. 10, 2014

(86) PCT No.: PCT/DK2014/050052
§ 371 (c)(1),
(2) Date: Sep. 11, 2015

(87) PCT Pub. No.: WO2014/139533
PCT Pub. Date: Sep. 18, 2014

(65) Prior Publication Data
US 2016/0021911 A1    Jan. 28, 2016

(30) Foreign Application Priority Data
Mar. 11, 2013   (DK) .............................. 2013 70144

(51) Int. Cl.
*A23G 9/28*   (2006.01)
*B65B 3/12*   (2006.01)
(Continued)

(52) U.S. Cl.
CPC ............. *A23G 9/282* (2013.01); *A23G 3/021* (2013.01); *A23G 3/0257* (2013.01); *A23G 9/28* (2013.01);
(Continued)

(58) Field of Classification Search
CPC  B65B 39/12; B65B 3/04; B65B 3/326; B65B 2039/009; A23G 9/282
(Continued)

(56) References Cited

U.S. PATENT DOCUMENTS

| | | |
|---|---|---|
| 2,850,990 A | 9/1958 | Rasmusson |
| 3,795,352 A | 3/1974 | Lewis |

(Continued)

FOREIGN PATENT DOCUMENTS

| | | |
|---|---|---|
| CN | 101031206 A | 9/2007 |
| CN | 101048337 A | 10/2007 |

(Continued)

*Primary Examiner* — Timothy L Maust
*Assistant Examiner* — Timothy P Kelly (57) ABSTRACT

A filling unit and a method for filling a confectionery mass into a container or a mold includes a fill housing with a filling nozzle (2) and at least two dosing pistons in a cylinder which is connected to the fill housing. In the fill housing, a valve is arranged for each cylinder. A mixing block with internal ducts connects each of the outlets with a respective internal duct in the filling nozzle. The confectionery mass is conducted from a filling nozzle into at least one of the cylinders after which the confectionery mass is dosed down into the mold or container by actuating the dosing pistons. The speeds of the pistons are controlled independently of each other, providing varying patterns in longitudinal direction of the ice-cream/confectionery product. The movement of the filling unit relative to the container or mold can be varied providing additional options for variation in patterns.

11 Claims, 3 Drawing Sheets

(51) Int. Cl.
  *A23G 3/02*   (2006.01)
  *B65B 25/00*  (2006.01)
  *B65B 39/00*  (2006.01)
  *B65B 3/32*   (2006.01)

(52) U.S. Cl.
  CPC ............... *A23G 9/287* (2013.01); *B65B 3/12* (2013.01); *B65B 3/326* (2013.01); *B65B 25/005* (2013.01); *B65B 39/001* (2013.01)

(58) Field of Classification Search
  USPC ........ 141/105, 236, 237–238, 242–244, 256, 141/258
  See application file for complete search history.

(56) References Cited

U.S. PATENT DOCUMENTS

| | | | | |
|---|---|---|---|---|
| 4,966,205 A | * | 10/1990 | Tanaka | ................... A45D 40/16 141/104 |
| 5,911,813 A | | 6/1999 | Jensen | |
| 2001/0009097 A1 | | 7/2001 | Cathenaut et al. | |
| 2005/0058748 A1 | * | 3/2005 | Bourguignon | ..... A23C 19/0765 426/130 |
| 2006/0051458 A1 | | 3/2006 | Fornaguera | |
| 2006/0051476 A1 | | 3/2006 | Fornaguera | |
| 2011/0200718 A1 | * | 8/2011 | Swertvaegher | .......... A23C 9/00 426/130 |

FOREIGN PATENT DOCUMENTS

| | | |
|---|---|---|
| CN | 201690996 U | 1/2011 |
| CN | 201691003 U | 1/2011 |
| CN | 202283993 U | 6/2012 |
| DE | 1 077 519 B | 3/1960 |
| DE | 197 58 443 A1 | 9/1998 |
| DE | 20 2004 020 460 U1 | 9/2005 |
| DE | 197 58 543 B4 | 9/2005 |
| EP | 0 931 462 A1 | 7/1999 |
| EP | 0 839 002 B1 | 1/2002 |
| JP | 2001-39402 A | 2/2001 |
| SE | 462 231 B | 5/1990 |
| WO | 97/03570 A1 | 2/1997 |
| WO | 2010/063541 A2 | 6/2010 |

* cited by examiner

Fig. 1

FILLING UNIT AND METHOD FOR FILLING A CONFECTIONERY PRODUCT INTO A MOULD OR A CONTAINER

BACKGROUND OF THE INVENTION

Field of the Invention

The present invention concerns a filling unit for use in filling a confectionery product into molds or containers, including a fill housing with a filling nozzle and a dosing piston, wherein the dosing piston is displaceably provided in a cylinder in the filling unit.

Description of Related Art

The invention also concerns a method for filling a confectionery mass, such as ice-cream, into a container or a mold.

The invention is particularly suited for filling any air-containing and thereby compressible confectionery product as, e.g., ice-cream, sorbet, mousse and the like. However, the invention can also be used for filling airless confectionery masses, including e.g., water-based ice mass. The invention will be explained in connection with ice cream but is not limited to this product only.

It is known to use filling units that can fill ice cream into containers of different kinds, including, e.g., conventional molds for ice cream where the ice cream is taken out of molds and subsequently packed, or discrete containers of e.g., plastic and/or suitable paper/paperboard/carton packings, or e.g., cones and other edible containers. These filling units are normally arranged in a filling arrangement where several filling units are mounted such that a row or an array of containers is filled at once.

These prior art filling units normally include a fill housing and a piston that doses the ice cream through a filling nozzle and down into containers arranged under the nozzles. An example of a prior art filling unit is disclosed in European Patent Application EP 0839002 A and corresponding U.S. Pat. No. 5,911,813. Therein is described a filling unit with a fill housing where a dosing piston doses ice cream with one or more colors to containers that are disposed under the mouthpiece/filling nozzle of the filling unit. When filling with several different ice cream masses, e.g., with different color and/or taste, the piston is provided with external ducts for one type of ice cream and is possibly hollow such that another type of ice cream can be dosed through the hollow part of the piston. A pattern can thereby be achieved in the confectionery product which is about the same in all cross-sections in the filling direction.

However, this type of filling units has several drawbacks. The dosing piston itself is obviously a technically complicated design. This dosing piston is also complicated to clean, in particular the ducts in the dosing pistons. Furthermore, the individual filling unit is, due to the design of the piston, fixed to dose the ice cream in a certain way or in a very few different ways.

SUMMARY OF THE INVENTION

It is the object of the invention to provide a method for filling confectionery, including particularly ice-cream, into a container, and a filling unit for dosing confectionery product into containers that overcome the above mentioned drawbacks. Furthermore, it is the object of the invention to provide a filling unit with a simple design and which at the same time is very flexible in use, as the way of the filling unit to dose the confectionery product with simple means can be varied such that the same apparatus can be used for producing many different variants of the confectionery product. A uniform dosing of ice cream in all containers is achieved simultaneously. Furthermore, an individual dosing of each type of ice cream in each individual filling is achieved. Thereby, different patterns can also be made in the longitudinal direction, i.e. the filling direction of the confectionery product, and ice and other confectionery product also having a pattern varying in the filling direction/longitudinal direction can be made.

These objects are achieved in that the filling unit includes two or more dosing pistons provided in each their cylinder which is connected to the fill housing, that in the fill housing a valve is arranged for each cylinder as each valve has a valve body with a first duct connecting a filling nozzle for the confectionery product with the interior of the cylinder when the valve body is in a first position, and a second duct connecting the cylinder with an outlet from the fill housing when the valve body is in a second position; and a patterning block with internal ducts connects each of the outlets from the fill housing with each their internal duct in the filling nozzle.

The filling nozzle is preferably replaceable such that the same filling unit can be used for making a plurality of variants of the product. The filling nozzle is preferably designed with one or more internal ducts so that ice cream can be dosed in one or more color and/or taste variants. In case of dosing a single ice cream mass, the mixing block will connect a filling nozzle with a single duct to a single dosing unit in the form of a cylinder with a filling piston. Alternatively, the same ice cream mass can be supplied to several cylinders and dosed via several ducts in the filling nozzle by dosing a single ice cream mass.

A filling nozzle dosing two different confectionery masses preferably has several ducts, and the cross-sectional shape of the ducts contributes to forming the desired patterns in the finished product. The internal duct can, e.g., have a circular cross-section, polygonal cross-section, e.g., triangular, quadrangular or with more edges, oval cross-section or the like. In addition, the internal duct can have more complex shapes, including, e.g., starshape, heart-shape, or similar. Alternatively, the filling nozzle can have more ducts, where a central duct, e.g., has cross-shape and where four ducts fill the area between the legs of the cross.

Each filling nozzle will preferably use a certain patterning block having ducts that connect each of the outlets from the fill housing with one or more of the ducts in the filling nozzle. It is also possible that each patterning block can be used together with several filling nozzles, and that each filling nozzle can be used together with various mixing blocks. These examples of the design of the filling nozzle and the patterning block are not to be regarded as limiting as other forms are possible.

In one embodiment, the movement of each of the dosing pistons in respective cylinders is controlled independently of the movement of the other dosing pistons. Hereby is achieved that each single dosing unit in the form of cylinder with dosing piston can dose ice cream independently of the other dosing units. The relationship between the different ice cream masses can hereby be varied during the dosing action, entailing that patterns varying in the dosing direction, i.e. the longitudinal direction of the mold or container as seen relative to the opening of the mold or container, can be formed.

In a further embodiment, the patterning block of the filling unit and/or the filling nozzle are/is replaceable. The same filling unit can hereby be used for dosing ice cream in the molds or containers such that ice or confectionery products with one or more colors, e.g., two, three, four, or more, and with many different patterns, can be achieved, as changing from producing a product with one pattern to another product with more or fewer colors and/or different patterns can easily be done by replacing either the mixing block or the filling nozzle, or both patterning block and filling nozzle. Hereby is achieved a production equipment for confectionery products, e.g., ice-cream, which is very flexible and which rapidly can be converted from producing one variant of the confectionery product to another variant of the confectionery product.

In yet an embodiment, the filling unit is connected to a control unit controlling the movement of the dosing pistons and/or the movement of the filling unit in relation to the mold or container to be filled. Controlling the movements is preferably effected by a servomechanism. The control system is preferably pre-programmed with various programs for making each variant of the confectionery product. Each program determines and controls the movements of respective dosing pistons and/or the entire movement of the filling unit relative to the mold or container relevant for achieving each of the variants of the confectionery product to be produced. This contributes to production equipment for confectionery products, e.g., ice-cream, which is very flexible and which rapidly can be converted from producing one variant of the confectionery product to another variant of the confectionery product.

By normal production of confectionery products, including ice-cream, a plurality of filling units will be mounted in a larger facility, e.g., on a rack, such that several molds or containers can be filled simultaneously. The movement itself of the filling unit can then occur in that the rack itself with the filling units is moved relatively to the molds or containers. It this case it is therefore advantageous if all the filling units produce the same variant as it is not possible to perform separate movement of the individual filling units in relation to the individual mold or container.

Since the choice of control programs will depend on the variant to be produced, and thereby also on which patterning block is installed in the filling unit, it is advantageous to provide the patterning block and possibly the filling nozzle with a code, e.g., by manually identifiable numbers and/or letters, or a machine-readable code, e.g., a conventional bar code or a so-called smart-code or QR-code in the form of a matrix code with data in two dimensions. At the same time is preferably added a unit that can read the code, preferably mounted on the filling unit, e.g., in the filling housing or on the rack on which the filling unit is mounted. The machine-readable code can hereby be used for determining the necessary programs for the variant or variants that may be produced by the patterning block mounted in the filling unit. Furthermore, the machine-readable code can be used for controlling if the correct patterning blocks and/or filling nozzles are mounted in the filling unit, or in all filling units, with regard to the pre-selected program. This will also minimize the risk of errors when shifting production of one variant to another variant of ice-cream. If numbers and/or letters are used, these can possibly be recognized manually in that the operator will observe that the correct filling nozzles are applied when replacing the mixer blocks and/or the filling nozzles. Alternatively, a manual inspection as to whether the desired mixing patterning blocks and/or filling nozzles have been mounted in the filling units can be performed.

The object of the invention is also achieved by a method for filling confectionery mass, such as ice-cream, into a container or a mold, in which is used a filling unit including a fill housing with a filling nozzle and at least two dosing pistons, each dosing piston provided displaceably in a cylinder which is connected to the fill housing, and that the filling unit is placed over a mold or container, that the outlet end of the filling nozzle of the filling unit is passed into the container or mold, that confectionery mass is conducted from a filling nozzle into at least one of the cylinders while the dosing piston in the cylinder is retracted into the cylinder, that the confectionery mass is dosed down into the mold or container by actuating the dosing pistons and moving them down into the cylinder whereby confectionery mass from each cylinder is dosed down into the mold or container via the mixer block and one or more individual ducts in the filling nozzle, as the dosing of the confectionery mass from each cylinder is controlled by controlling the movement of each dosing piston independently of the movement of the other dosing pistons, and that the filling unit is actuated to move such that the filling nozzle is retracted from the mold or container during dosing of the confectionery mass. Hereby is achieved that each single dosing unit in the form of cylinder with dosing piston can dose confectionery mass independently of the other dosing units. The relationship between the different ice-creams and/or other confectionery masses can hereby be varied during the dosing action, entailing that patterns varying in the dosing direction, i.e., in axial direction of the mold or container, can be formed. In that the dosing pistons are individually adjustable it will be easy to finely adjust the dosing such that the patterns will clearly appear in the finished confectionery product.

In an embodiment of the method, at least two different confectionery masses are dosed from at least two individual cylinders with dosing pistons mounted in the filling unit. Alternatively, three, four or more cylinders with filling pistons are mounted on the fill housing of the filling unit, depending on the number of confectionery masses that are wanted dosed. For example, it is possible to use one or more cylinders for dosing ice cream in one or more colors and/or taste variants, and to use another cylinder for dosing a different mass such that a so-called ripple effect is produced. The other mass can, e.g., be pastes, fondants, or in fluid form appearing in a thinner layer, a so-called ripple, in the ice-cream. Suitable masses in fluid form are, e.g., food colors, syrups, including syrups added flavor and/or color, marmalades, melted ingredients such as, e.g., chocolate, caramel, nougat, or suitable sauces with taste of, e.g., fruit, caramel, liquorice, chocolate or similar. Suitable pastes are, e.g., pastes of flavoring ingredients, e.g., nuts of different kinds, peanuts or similar. The other mass can also be supplied to the ice cream via an independent duct in the patterning block which feeds the other mass into the ice cream while passing through the patterning block. Since there is a strong turbulence in the ice cream during passage through the patterning block, the other mass will easily be mixed into the ice cream and form the desired ripple-effect.

When the mold or container is to be filled, it is preferably arranged under a vertically suspended filling unit, and the outlet end of the filling nozzle is moved down into the mold or container. The filling nozzle is gradually drawn out of the mold or container during the filling. It is preferred that the component of movement of the filling unit in axial direction, i.e., seen in relation to the axis of the filling nozzle, i.e. preferably vertically, and thus in parallel with the longitudinal direction of the filling unit; drawing the filling nozzle out of the mold or container occurs stepwise or continuously with constant or varying speed. Many additional possibilities for variations in patterns of the product are hereby achieved as the varying and individual dosing of the confectionery masses by each of the pistons can be combined with variations in the movement of the filling unit in vertical direction. This contributes to formation of further variations in the pattern, and that the apparatus thereby can be used for making further variants.

In a variant of the method, it is additionally preferred that the component of movement of the filling unit which is at right angles to the axial direction occurs in a rectilinear, star-shaped, zigzag-shaped, or circular movement pattern. Many additional options for variation in patterns of the product are hereby attained as the varying and individual dosing of the confectionery masses by each of the pistons can be combined with variations in the movement of the filling unit in vertical direction, and possibly in horizontal direction as well.

In an embodiment of the invention, the movements of the filling unit and/or the dosing pistons are preferably controlled by a servomechanism, as described above.

The invention will now be described with reference to the drawings.

DETAILED DESCRIPTION OF THE INVENTION

Figure 1:
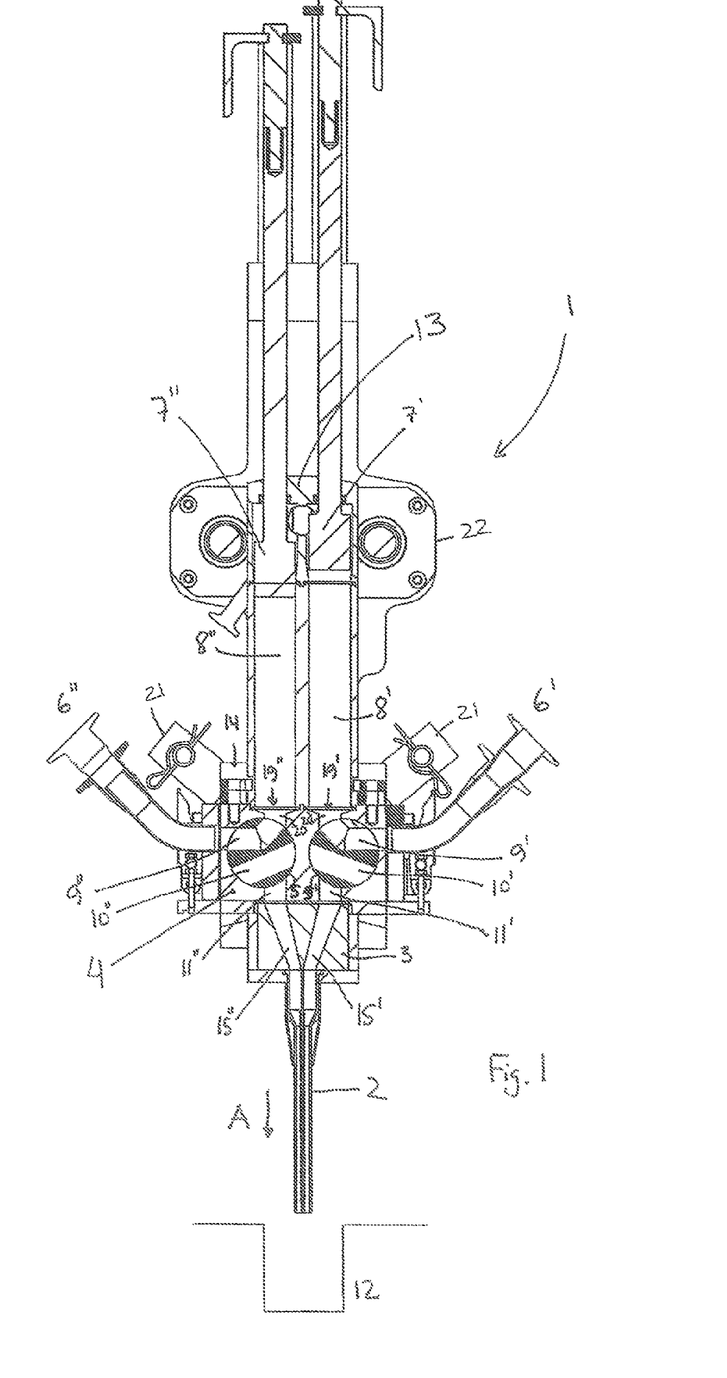
FIG. 1 shows a cross section view through a filling unit according to the invention where ice cream is filled into one or more of the cylinders.
Figure 2:
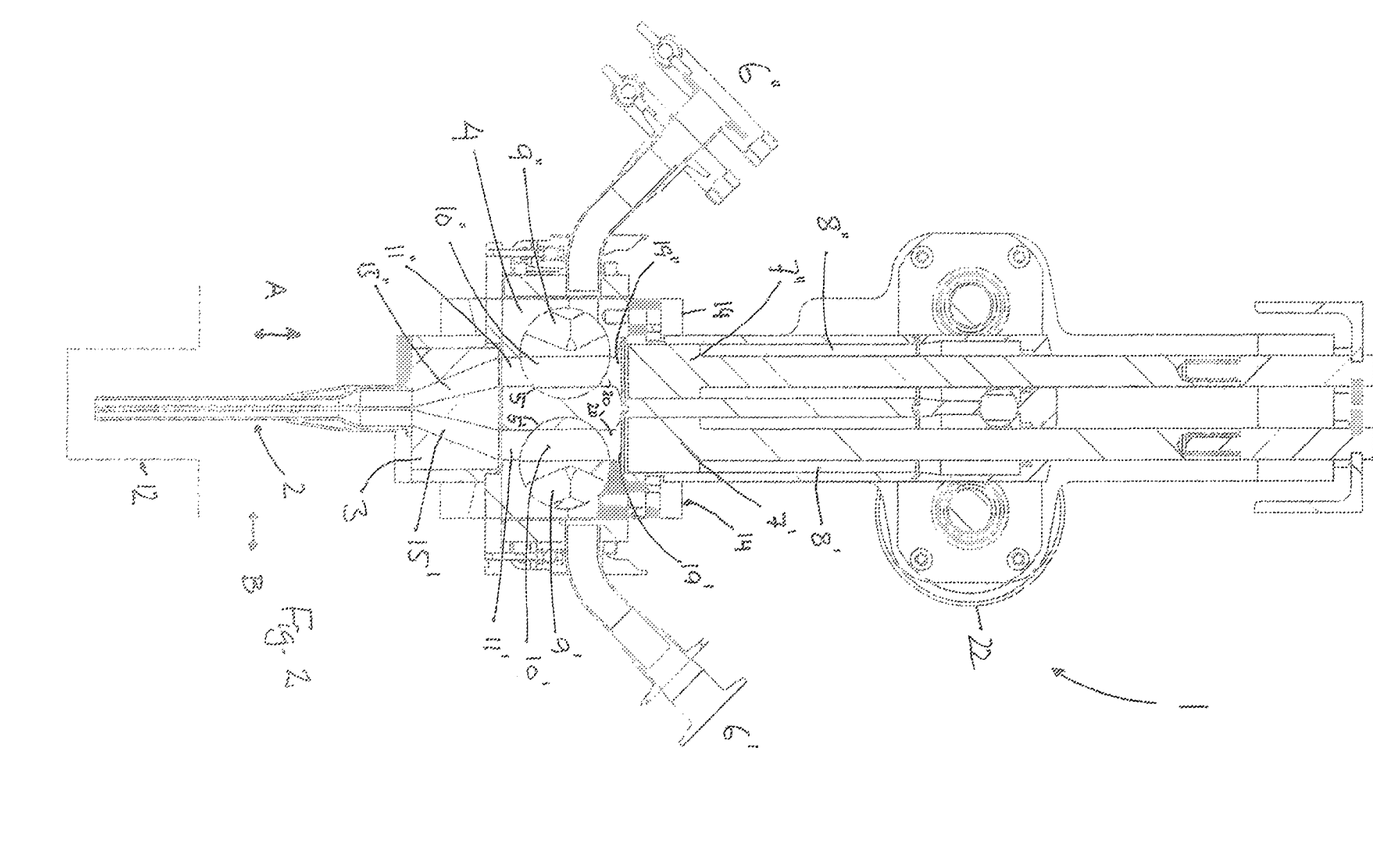
FIG. 2 shows a cross section view through a filling unit according to the invention where ice cream is dosed into the mold.

FIGS. 1 and 2 show a filling unit according to the invention in two different positions to be described in more detail in the following. The filling unit 1 is used particularly for dosing ice cream and similar confectionery products as described above. The filling unit includes a fill housing 4. On the fill housing 4 is mounted a cylindrical casing 13 which is connected to the fill housing 4 in a conventional way, e.g., by a suitable number of bolts 14.

The cylindrical casing 13 includes two or more cylinders 8', 8", e.g., three, four, five or six cylinders, each cylinder 8', 8" fitted with a dosing piston 7', 7" seated in each their cylinder 8', 8". FIGS. 1 & 2 show an embodiment with two cylinders 8', 8" and two pistons 7', 7". A dosing unit thus includes a cylinder 8', 8" and the associated piston 7', 7", and these dosing units can have the same diameter, alternatively different diameters. In the fill housing 4, a valve body 5', 5" is arranged for each cylinder 8', 8". Each valve body 5', 5" is provided with a first duct 9', 9" connecting a filling nozzle 6', 6" for the ice cream with the interior of the cylinder 8', 8" when the valve body 5', 5" stands in its first position (FIG. 1), and a second duct 10', 10" connecting the interior of the cylinder 8', 8" with an outlet 11', 11" from the fill housing 4 when the valve body 5', 5" is in its second position (FIG. 2). Preferably, the fill housing 4 and the valve bodies 5, 5' of a number of linearly aligned filling stations 1 are integrated into a common unit.

The filling nozzles 6', 6" are connected with an ice cream freezer (not shown) via hoses and hose couplings (not shown) in a conventional way. Alternatively, one or more of the filling nozzles 6', 6" can be connected to a container (not shown) with a different mass, which is used as described in more detail below.

The filling nozzle 2 is preferably replaceable such that the same filling unit 1 can be used for making a plurality of variants of the product. The filling nozzle 2 is preferably designed with one or more internal ducts so that ice cream can be dosed in one or more color and/or taste variants. In case of dosing a single ice cream mass, the patterning block 3 will connect a filling nozzle 2 with a single duct to a single dosing unit in the form of a cylinder 8' or 8" with a dosing piston 7' or 7". Alternatively, the same ice cream mass can be supplied to several cylinders 8', 8" and dosed via several ducts in the filling nozzle 2 by dosing a single ice cream mass.

A filling nozzle 2 dosing two different confectionery masses preferably has several ducts, and the cross-sectional shape of the ducts contributes to forming the desired patterns in the finished product. Non-limiting examples thereof are shown on FIGS. 4a-4e as these show the cross-section of the patterning block 3 at the outlet for the filling nozzle 2. Suitable filling nozzles 2 thus have a corresponding cross-section at the outlet end. The filling nozzle 2 can, e.g., have two ducts, each with a semi-circular cross-section, FIG. 4a, 4b, or an internal duct surrounded by an external annular duct, FIG. 4c. The internal duct can, e.g., have a circular cross-section, polygonal cross-section, e.g., triangular, quadrangular or with more edges, oval cross-section or the like. In addition, the internal duct can have more complex shapes, including, e.g., star shape, heart shape, or similar. Alternatively, the filling nozzle 2 can have several ducts, where a central duct, e.g., is cruciform and where four ducts fill the area between the legs of the cross, FIG. 4c.

Figures 3A, 4A, 4B:
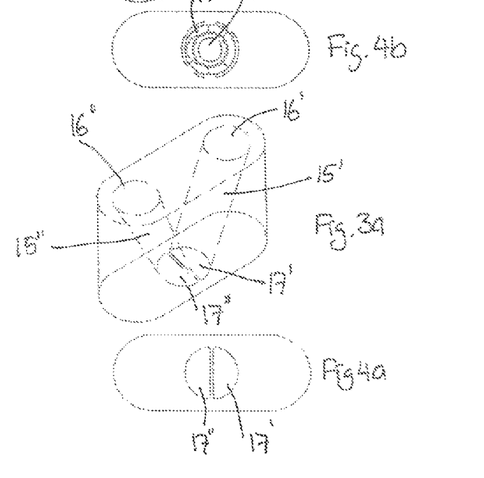
FIGS. 3a-3e show various embodiments of the patterning block used in connection with dosing of one or two different masses of ice-cream.
FIGS. 4a-4e show examples of the cross-section of the mixing block at the outlet end and thereby also the possible cross-sections of the filling nozzle in various embodiments of the patterning block and the filling nozzle.

Each filling nozzle 2 will preferably use a specific mixing block 3, see FIGS. 3a-3e, with ducts 15', 15" that connect each of the outlets 11', 11" from the fill housing 4 with one or more of the ducts in the filling nozzle 2. It is also possible that each mixing block 3 can be used together with several filling nozzles 2, and that each filling nozzle 2 can be used together with various mixing blocks 3. FIG. 3a shows a mixing block 3 having ducts 15', 15" which connect at a first end 16', 16" with one of the outlets 11', 11" from the fill housing 4. The other ends of the ducts 15', 15" are connected with the inlet end of one of the through-going internal ducts in the filling nozzle 2. This means that each cylinder 8', 8" via valve 5', 5" and ducts 15', 15" in the patterning block 3 is connected with at least one internal duct in the filling nozzle 2.

Figure 3B:
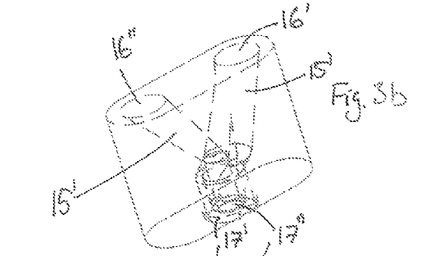
Figure 3C:
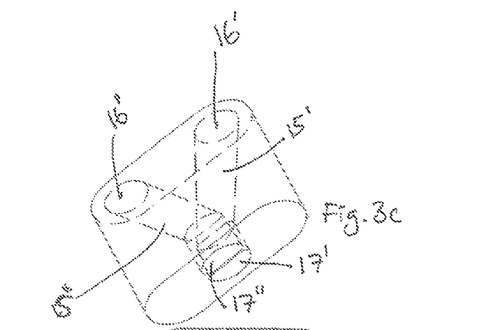
Figure 3D:
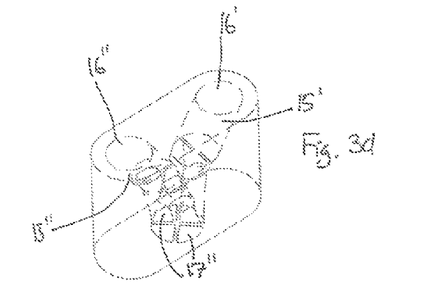
Figure 3E:
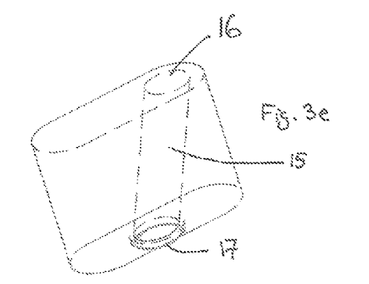
Figure 4C:
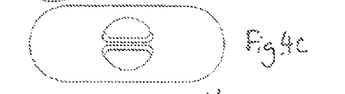
Figure 4D:
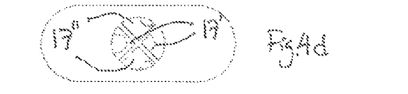
Figure 4E:
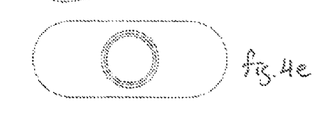

FIGS. 3b-3d show alternative designs of the patterning block 3 where two cylinders 8', 8" are connected with each their internal duct in the filling nozzle 2 with the object of forming different patterns in the ice-cream, particularly in the cross-section, but also in longitudinal direction of the ice or confectionery product. FIG. 3e shows a patterning block 3 which can be applied by dosing a single ice cream mass using one of the cylinders 8', 8" and one of the filling pistons 7', 7". These examples of the design are not to be regarded as limiting for the invention as other forms are possible, depending on how many cylinders 8 with filling pistons 7 with which the filling unit is provided, and depending on shape and number of the internal ducts in the filling nozzle 2. The examples of the design of the filling nozzle 2 and the patterning block 3 shown in FIGS. 4*a*-4*e* are not to be regarded as limiting for the invention as other designs are possible.

In one embodiment, the movement of each of the dosing pistons 7', 7" in respective cylinders 8', 8" is controlled independently of the movement of the other dosing pistons 7', 7". Hereby is achieved that each single dosing unit in the form of cylinder with dosing piston can dose ice cream independently of the other dosing units. The ratio between the various ice cream masses can hereby be varied during the dosing, e.g., by briefly stopping the movement of a filling nozzle 7', whereby the dosing of ice cream mass from this cylinder 8' is briefly interrupted without stopping the dosing from the remaining cylinders. Alternatively, the rate of motion of a piston, e.g., the piston 7', can be reduced simultaneously with increasing the rate of motion of another piston, e.g., the piston 7'. Patterns varying in the direction of dosing, i.e., in the axial, longitudinal direction of the mold or container 12 viewed relative to the opening of the mold or container 12, can hereby be formed.

In an alternative variant, the movements of the pistons 7', 7" in all dosing units are controlled uniformly in that the dosing of ice-cram from a dosing unit thereby is fixed relative to the other dosing units. By this variant, however, there is not achieved any appreciable flexibility in the formation of patterns in the finished confectionery product.

In yet another embodiment, the filling unit 1 is connected to a control unit (not shown) controlling the movement of the dosing pistons 7', 7" and/or the movement of the filling unit 1 in relation to the mold or container 12 to be filled. Control of the movements is preferably performed by a conventional servomechanism. The control system is preferably pre-programmed with various programs for making each variant of the confectionery product. Each program determines and controls the movements of respective dosing pistons 7', 7" and/or the entire movement of the filling unit relative to the mold or container 12 relevant for achieving each of the variants of the confectionery product to be produced. This means also that the production equipment for confectionery products, e.g., ice-cream, is very flexible and rapidly can be converted from producing one variant of the confectionery product to another variant of ice-cream, as this change only requires selection of desired program and possibly replacement of filling nozzles 2 and/or patterning blocks 3.

By normal production of confectionery products, including ice-cream, more filling units 1 will be mounted in a larger facility, e.g., on a rack (not shown), such that several molds or containers 12 can be filled simultaneously. The movement itself of the filling unit 1 can then occur by the rack itself with the filling units 1 that being moved relatively to the molds or containers 12. It this case it is therefore advantageous if all the filling units 1 produce the same variant, as it is not possible to perform separate movement of the individual filling units 1 in relation to the individual mold or container 12.

Since the choice of control programs will depend on the variant to be produced, and thereby also on the Since the choice of control programs will depend on the variant to be produced, and thereby also on the patterning block 3 and/or filling nozzle 2 installed in the filling unit 1, it is advantageous to provide the patterning block 3 and possibly also the filling nozzle 2 with a code that will ensure application of the correct patterning blocks 3 and/or filling nozzles. The code can, e.g., consist of numbers and/or letters, machine-readable code (not shown), e.g., a conventional bar code or so-called smart-code or QR-code in the form of a matrix code with data in two dimensions. At the same time, preferably a unit (not shown) is added that can read the code, preferably on the filling unit 1, e.g., in connection with the fill housing 4, or the rack on which the filling unit 1 is mounted. The machine-readable code can hereby be used for determining the necessary programs for the variant or variants that may be produced by the patterning block 3 and/or the filling nozzle 2 mounted in the filling unit 1. Furthermore, the machine-readable code can be used for checking if the correct patterning block 3 and/or filling nozzles 2 are mounted in the filling unit 1, or in all filling units 1, with regard to the pre-selected program. This will also minimize the risk of errors during change of production of one variant to another variant of ice-cream. By using numbers and/or letters, these may be recognized manually, as the operator, by replacement of the patterning blocks 3 and/or the filling nozzle 2, will observe that the correct mixing blocks 3 and/or filling nozzles 2 are used in relation to the product to be produced. Alternatively, a manual inspection as to whether the desired patterning blocks 3 and/or filling nozzles 2 have been mounted in the filling units 1 can be made.

By filling confectionery mass such as ice cream into a container or a mold 12, there is used a filling unit 1 as described above. A number of filling units 1 as above will normally be suspended side by side or in an array on a rack or similar (not shown) with fittings 19, 20, and preferably mounted in vertical position with the filling nozzle 2 downwards and the piston end upwards, as shown on FIGS. 1 and 2.

The filling process is initiated by placing a mold or container 12 under each filing unit 1. The entire filling unit 1 is then lowered so that the outlet end of the filling nozzle 2 is moved down into the container or mold 12, preferably close to the bottom of the container or mold. Confectionery mass, e.g., ice-cream, is conducted from a filling nozzle 6', 6" simultaneously therewith or in a separate step in beforehand or after positioning the molds 12. The ice cream is conducted into at least one of the cylinders 8', 8" while the dosing piston 7', 7" is retracted into the cylinder. As mentioned above, for each cylinder 8', 8" there is mounted a valve body 5', 5" in the fill housing 4, preferably operating as a three-way valve. During the filling of ice cream into each cylinder 8', 8", the valve bodies 5', 5" stand in a first position (FIG. 1) where a first duct 9', 9" in the valve body 5', 5" connects the filling nozzles 6', 6" with the lower opening 19', 19" in each cylinder 8', 8", e.g., via the upper part 20', 20" of a connecting duct in the fill housing 4. When each of the cylinders 8', 8" have been filled with the desired amount of ice cream mass, the valve bodies 5', 5" are rotated to their second position (FIG. 2), where a second duct 10', 10" in the valve body 5', 5" now connects the lower opening 19', 19" of each of the cylinders 8', 8" with the outlet 11', 11" from the fill housing 4. Rotation of the valve bodies 5', 5" is preferably controlled by hydraulics, pneumatics or corresponding conventional means. Ice cream and/or other confectionery mass can hereby be dosed down into the mold or container as the dosing pistons 7', 7" are activated and moved down into the cylinder 8', 8", whereby ice cream and/or confectionery mass is dosed from the cylinders 8', 8" down into the mold or container 12 via ducts in the filling nozzle 2. The dosing of ice cream or confectionery mass from each cylinder 8', 8" is controlled by the movement of each dosing piston 7', 7" which is controlled independently of the movement of the other dosing pistons 8', 8".

Simultaneously with activation of the filling pistons 7', 7", an upwards movement of the filling unit 1 is initiated so that the point of the filling nozzle 2 is gradually drawn up from the mold or container 12 during filling of the ice cream and/or confectionery mass(es). By controlling the movement of each single dosing piston independently of the other pistons 7', 7" in the filling unit 1, it is achieved that each single dosing unit in the form of cylinder 8', 8" with dosing piston 7', 7" can dose ice cream and/or confectionery mass independently of the other dosing units in the same filling unit 1. The ratio between the different ice cream and/or other confectionery masses can hereby be varied during the dosing action, whereby patterns varying in the dosing direction, i.e., in axial direction of the mold or container, can be formed.

In an embodiment of the method, at least two different confectionery masses are dosed from at least two individual cylinders 8', 8" by dosing pistons 7', 7" in each filling unit 1. Alternatively, three, four or more cylinders with filling pistons are mounted on the fill housing 4 of the filling unit, depending on the number of ice cream and/or confectionery masses desired to be dosed to the mold or container 12. Thereby it becomes possible to use one or more cylinders 8', 8" for dosing ice cream in one or more colors and/or taste variants, and to use another cylinder, e.g., 8", for dosing a different mass such that a so-called ripple effect is produced, for example. The other mass can, e.g., be pastes, fondants, or more or less viscous liquids appearing in a thinner layer, a so-called ripple, in the ice-cream. Suitable liquids are, e.g., food colors, syrups, including syrups added flavor and/or color, marmalades, melted ingredients such as e.g., chocolate, caramel, nougat, or suitable sauces with taste of, e.g., fruit, caramel, liquorice, chocolate or similar. Suitable pastes are, e.g., pastes of flavoring ingredients, e.g., nuts of different kinds, peanuts or similar. The other mass can also be fed to the ice cream via an independent duct (not shown) in the mixing block 3 which feeds the other mass into the ice cream while it passes through the ducts 15, 15' in the mixing block 3. Since there is a strong turbulence in the ice cream during passage through the ducts 15 in the mixing block 3, the other mass will easily be mixed into the ice cream and thereby produce the desired ripple-effect.

The filling nozzle 2 is gradually drawn out of the mold or container 12 during the filling. It is preferred that the component of movement of the filling unit 1 in axial direction A, i.e., as seen in relation to the longitudinal axis of the filling nozzle 2 and thus in parallel with the longitudinal direction of the filling unit 1, corresponding to a vertical movement on FIGS. 1 and 2, occurs stepwise or continuously with constant or varying speed. Many additional options for varying the patterns of the product are hereby achieved as the varying and individual dosing of the confectioner masses by each of the pistons 7', 7" can be combined with variations in the movement of the filling unit 1 in vertical direction, i.e. the withdrawing speed of the filling nozzle 2 from the mold or container. This contributes to formation of further variations in the pattern, and the apparatus can hereby be used for making further product variants.

In a variant of the method, the movement of the filling unit 1 has a component B which is perpendicular to the axial direction, i.e. in the horizontal direction on FIGS. 1-2, and the movement of the outlet point of the filling unit 2 during withdrawing from the mold or container 12 does not necessarily describe a linear path thereby. The horizontal movement can, e.g., occur in a rectilinear, star-shaped, zigzag-shaped or circular movement pattern. By the circular horizontal movement combined with the rectilinear vertical movement there is achieved, e.g., a helical movement pattern for the filling nozzle 2 point. This means that the perpendicular/horizontal component of movement contributes to creation of additional options for making various patterns in cross-section as well as in longitudinal direction of the mold. Many additional options for variation in patterns of the product are hereby achieved as the varying and individual dosing of the confectionery masses with each of the filling pistons 7', 7" can be combined with variations in the movement of the filling unit 1 in vertical direction A, and possibly in horizontal direction B as well.

In an embodiment of the invention, the movements of the filling unit and/or the dosing piston are preferably controlled by a servomechanism, as mentioned above.

It may occur that after finishing the filling, ice cream can hang on the outermost point of the filling nozzle 2 as well as a small top of ice cream can appear on the surface of the dosed ice cream in the mold 12 if the ice cream is dosed at temperatures below 0° C., e.g., at about −5° C. The individual control of the dosing units will allow that, at the moment when the filling is finished, a short re-suction is performed by pulling the piston 7', 7" back into the dosing unit which has dosed the last ice-cream. The top as well as the ice cream possibly hanging on the point of the filling nozzle 2 are thereby removed. This effect can also be achieved if any of the dosing units performs the re-suction.

The invention claimed is:

1. A filling unit for use in filling a confectionery product into containers, including a fill housing with a filling nozzle, at least two cylinders and a dosing piston in each of the at least two cylinders,
wherein, in the fill housing, a valve is arranged for each cylinder, in that each valve has a valve body with a first duct connecting in the filling nozzle for the confectionery product with the interior of one of the cylinders when the valve body is in a first position, and a second duct in the filling nozzle connecting another of the cylinders when the valve body is in a second position; and
wherein a patterning block with internal ducts connects each of the valves with the respective one of the first and second duct in the filling nozzle.

2. A filling unit according to claim 1, wherein a movement of each piston in the cylinder is controlled independently of the other dosing pistons.

3. A filling unit according to claim 1, wherein at least one of the patterning block and the filling nozzle are replaceable.

4. A filling unit according to claim 1, wherein the filling unit is connected to a control unit controlling movement of at least one of the dosing pistons and movement of the filling unit in relation to one of a mould and a container to be filled.

5. A method for filling a confectionery mass into one of a container and a mould, wherein a filling unit is used which includes a fill housing with a filling nozzle and at least two dosing pistons, each dosing piston provided displaceably in a cylinder which is connected to the fill housing, and the filling nozzle having a plurality of individual ducts, each individual duct connected for receiving confectionary mass from at least a respective one of the cylinders via a patterning block; the method comprising:
disposing the filling unit over one of a mould and a container;
moving the filling nozzle of the filling unit into one of the container and mould;
conducting a confectionery mass from a filling nozzle (6', 6") into at least one of the cylinders while the dosing piston in the cylinder (A) is retracted into the cylinder;
dosing confectionery mass down into one of the mould and container as the dosing pistons are activated and moved down into the cylinder (B), whereby confectionery mass is dosed from each cylinder down into one of the mould and container via the patterning block and via at least one of said individual ducts in the filling nozzle, as the dosing of confectionery mass from each cylinder is controlled in that the movement of each dosing piston is controlled independently of movements of the other dosing pistons; and actuating the filling unit such that the filling nozzle is drawn out of one of the mould and container during the dosing of the confectionery mass.

6. Method according to claim 5, wherein at least two different confectionery masses are dosed from at least two individual cylinders by dosing pistons.

7. Method according to claim 5, wherein a component of movement of the filling unit in an axial direction drawing the filling nozzle out of one of the mould and the container occurs stepwise with constant speed.

8. Method according to claim 5, wherein a component of movement of the filling unit in an axial direction drawing the filling nozzle out of one of the mould and the container occurs stepwise with varying speed.

9. Method according to claim 5, wherein a component of movement of the filling unit in an axial direction drawing the filling nozzle out of one of the mould and the container occurs continuously with constant speed.

10. Method according to claim 5, wherein a component of movement of the filling unit in an axial direction drawing the filling nozzle out of one of the mould and the container occurs continuously with varying speed.

11. Method according to claim 5, wherein a component of movement of the filling unit which is at right angles to an axial direction occurs in one of a rectilinear, a zigzag-shaped, and a circular pattern of movement.

* * * * *